United States Patent [19]

Ellison-Taylor

[11] Patent Number: 5,796,402
[45] Date of Patent: Aug. 18, 1998

[54] METHOD AND SYSTEM FOR ALIGNING WINDOWS ON A COMPUTER SCREEN

[75] Inventor: Ian Ellison-Taylor, Mercer Island, Wash.

[73] Assignee: Microsoft Corporation, Redmond, Wash.

[21] Appl. No.: 620,748

[22] Filed: Mar. 8, 1996

Related U.S. Application Data

[63] Continuation of Ser. No. 161,788, Dec. 3, 1993, abandoned.

[51] Int. Cl.⁶ .......................................................... G06F 3/14
[52] U.S. Cl. ................................................ 345/342; 345/340
[58] Field of Search ........................................ 395/342, 340; 345/119, 120

[56] References Cited

U.S. PATENT DOCUMENTS

| | | | |
|---|---|---|---|
| 4,974,174 | 11/1990 | Kleinman | 395/342 X |
| 5,060,170 | 10/1991 | Bourgeois et al. | 395/342 |
| 5,144,693 | 9/1992 | Morgan | 395/342 |
| 5,371,847 | 12/1994 | Hargrove | 395/342 |
| 5,377,317 | 12/1994 | Bates et al. | 395/342 |
| 5,390,295 | 2/1995 | Bates et al. | 395/342 |
| 5,487,143 | 1/1996 | Southgate | 395/342 |
| 5,561,757 | 10/1996 | Southgate | 395/340 |
| 5,577,187 | 11/1996 | Mariani | 395/342 |
| 5,657,463 | 8/1997 | Bingham | 395/342 |

OTHER PUBLICATIONS

Giglio, "Microsoft Corporation—Company Report," Jul. 14, 1989, p. 2.
*Microsoft Windows User's Guide, Version 1.0*, Microsoft Corporation, Redmond, WA, 1985, pp. 17–28 and 45–52.
Cohen et al., "Automatic Strategies in the Siemens RTL Tiled Window Manager," IEEE, 1988, pp. 111–119.
Myers, "A Taxonomy of Window Manager User Interfaces," IEEE, 1988, pp. 65–84.
Cohen et al., "Constraint–Based Tiled Windows," in *Proceedings of the 1ˢᵗ International Conference on Computer Workstations*, Nov. 1984, pp. 2–11.
*Microsoft® Windows™ Version 3.1 User's Guide for the Microsoft Windows Operating System*, 1990–1992, Chap. 3, "What is Program Manager?" pp. 71–76.

*Primary Examiner*—Mark R. Powell
*Assistant Examiner*—Crescelle N. dela Torre
*Attorney, Agent, or Firm*—Seed and Berry LLP

[57] ABSTRACT

A computer system aligns windows on a computer screen in a manner that approximates the relative position and size of the windows as they were before being aligned. A preferred method aligns "opposing sides" of all pairs of windows (the nearest parallel sides of each pair of different windows) where such alignment can take place without creating overlaps among any of the windows. The aligned windows are then expanded to fill the bounding window in which they are provided by aligning the sides of the windows with adjacent sides of the bounding window.

38 Claims, 14 Drawing Sheets

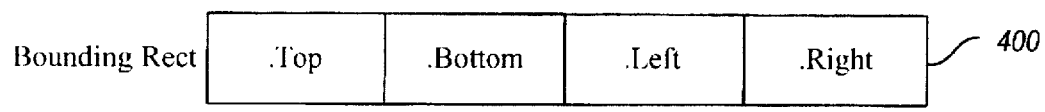
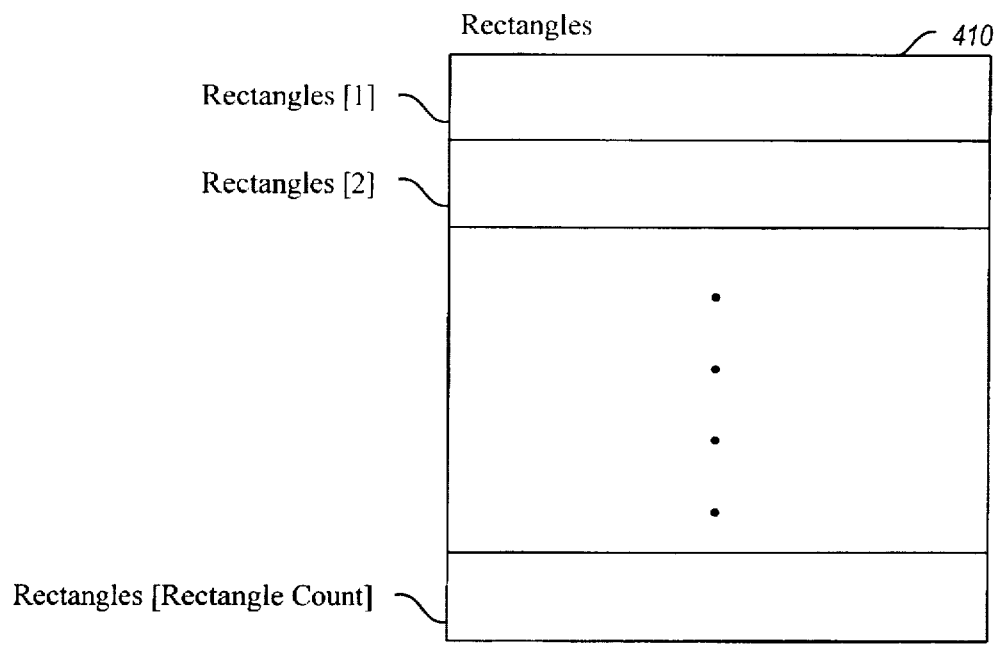
Fig. 4
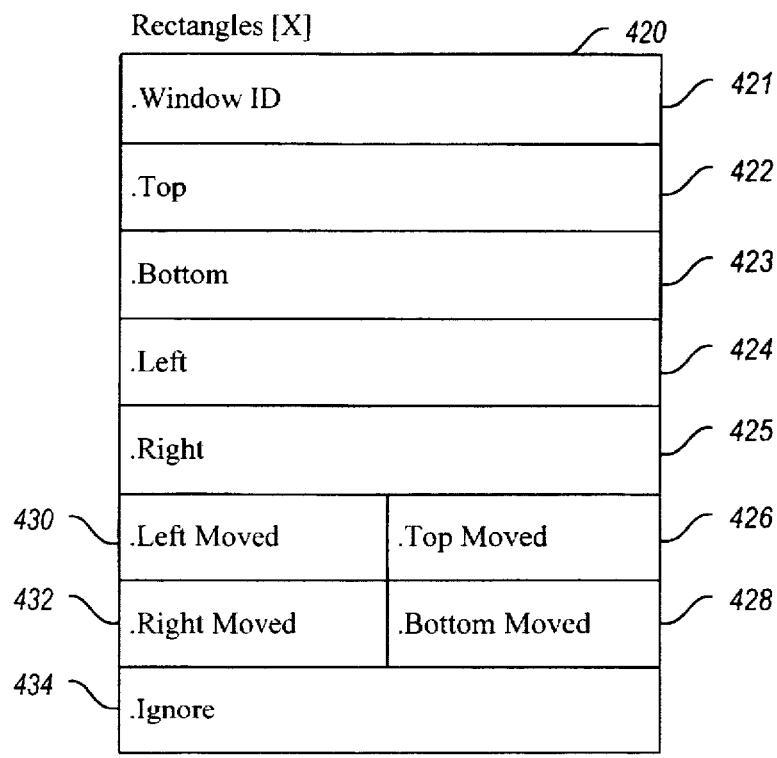

METHOD AND SYSTEM FOR ALIGNING WINDOWS ON A COMPUTER SCREEN

CROSS-REFERENCE TO RELATED APPLICATION

This application is a file-wrapper-continuation of U.S. patent application Ser. No. 08/161,788, filed Dec. 3, 1993, now abandoned.

TECHNICAL FIELD

The present invention relates to the field of computer display systems and, more particularly, to placement of windows on a computer screen.

BACKGROUND OF THE INVENTION

Operating systems and windowing systems often support a graphical user interface for interfacing between application programs and users. A graphical user interface is a display format for displaying information within one or more windows on a computer screen. A window is a specific sub-area within the entire display area of the computer screen, or the entire display area itself. Each application program typically has its own window through which it interfaces with a user. When an application program is started, it creates and displays the window using the graphical user interface features supported by the operating system. When a window is first created, it is typically displayed in a default position. Once the windows have been displayed, the user can rearrange the windows on the computer screen using a mouse or other input device.

When many application programs are executing, the computer screen may become cluttered with windows that overlap or are otherwise not arranged so that it is convenient for the user. Although the user can reposition and resize the windows using the mouse, such repositioning and resizing can be tedious and time consuming.

Accordingly, existing windowing systems typically provide a feature called "tiling." Tiling involves the automatic alignment of the windows on the computer screen so that they fill the entire display area and their sides (borders) touch. An example of a conventional tiling method is illustrated in FIGS. 1A and 1B. FIG. 1A shows a typical arrangement in which a number of windows A–F are displayed on a computer screen. In this example, it is assumed that windows A–F have been last accessed by the user in alphabetical order. That is, window F has been most recently accessed, window E has been accessed most recently before window F, and so on.

When the user requests the operating system to "tile" the windows of FIG. 1A, the windows A–F are redrawn in the conventional fashion shown in FIG. 1B. This conventional method divides the display area by the number of windows (six, in the instant case) and then redisplays the windows in equally sized portions of the display area. The conventional method displays the equally sized windows in the order of their most recent use, as shown in FIG. 1B.

Although the conventional tiling method described above provides a method of organizing the windows and maximizing the use of the display area, the user may find the size and position of the tiled windows to be inconvenient. One reason for this inconvenience is that the user may have resized some windows to be larger than other windows based on some preference. By redisplaying all the windows to be the same size, the conventional tiling method loses the preference.

Another reason the user may find the conventionally tiled windows inconvenient is that the user may have specifically positioned each window based on preference. For example, the user may have positioned the most frequently used or most important window in a central part of the display screen. The conventional tiling method disregards this preference when repositioning the windows.

It would be desirable to have a windowing system that could automatically rearrange windows based on user preference for sizing and positioning.

SUMMARY OF THE INVENTION

It is an object of the present invention to provide a method and system for automatically positioning windows.

It is another object of the present invention to provide a method and system for positioning windows based on the current position and size of the windows.

These and other objects, which will become apparent as the invention is described below in detail, are provided by a computer method and system for aligning windows on a computer screen. The system aligns the windows based on the relative position and size of the windows as they were before being aligned. The system aligns "opposing sides" of pairs of windows (the nearest parallel sides of each pair of different windows) where such alignment can take place without creating overlaps among any of the windows. The system preferably aligns opposing sides by moving each sides to the mid point between the sides. After the windows are aligned, the system then expands the aligned windows to fill the computer screen or other bounding window.

The system of the present invention preferably eliminates "secondary overlaps" among the windows prior to aligning the windows. A secondary overlap occurs when one window overlaps another window by less than a predetermined amount. All other overlaps are "primary overlaps." Secondary overlaps are eliminated by aligning the borders of the overlapping windows. In one embodiment, windows that form a primary overlap are not aligned by the system and retain their original position.

BRIEF DESCRIPTION OF THE DRAWINGS

FIG. 4 is an illustration of the data structures utilized by the tiling program.

DETAILED DESCRIPTION OF THE INVENTION

Figure 2:
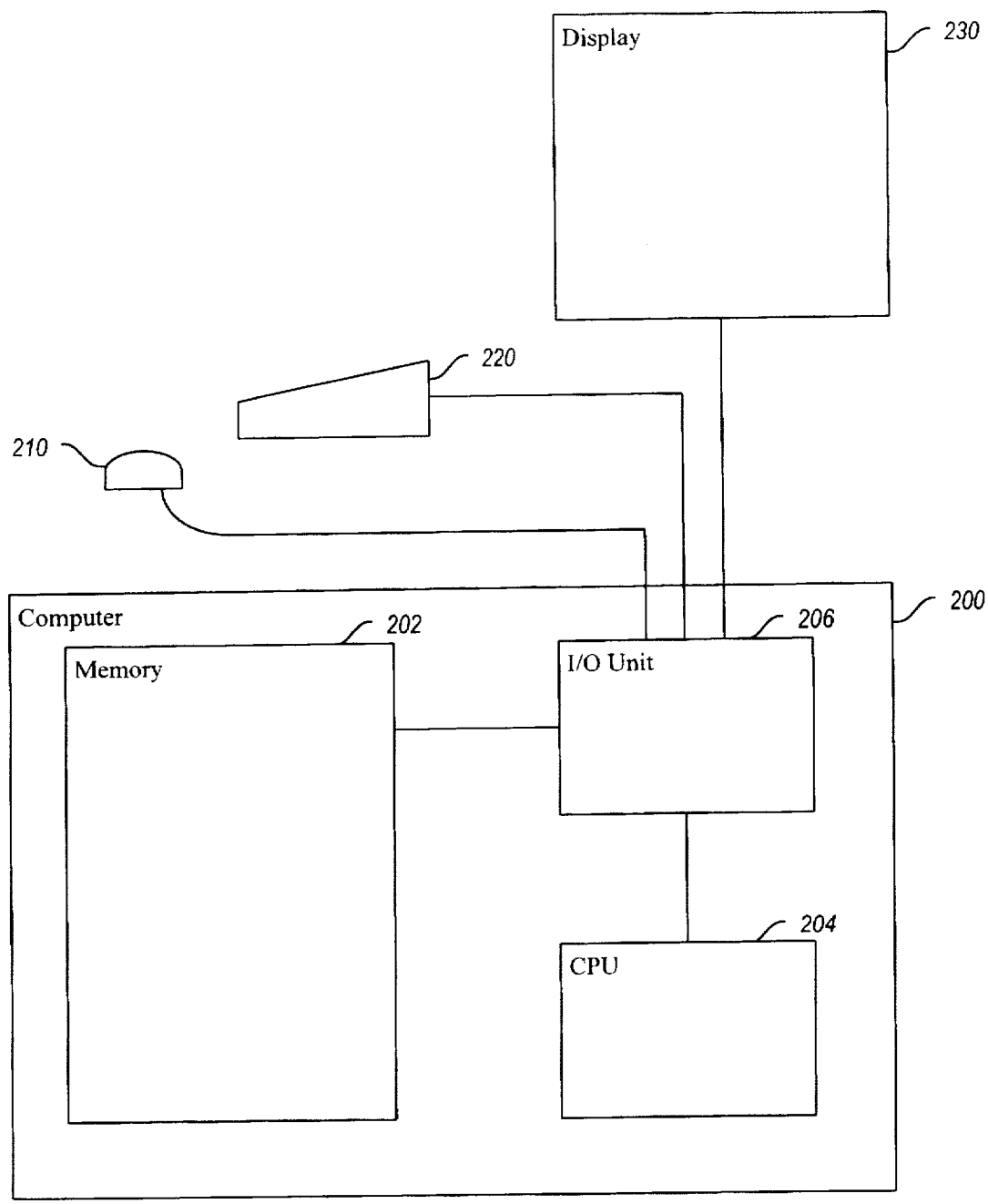
FIG. 2 is an illustration of a computer system suitable for performing the method of the present invention.

The present invention provides a computer method and system for aligning windows on a computer screen. A computer system suitable for performing methods of a preferred embodiment is shown in FIG. 2. The computer system includes a computer 200 which maintains the coordinates of the windows and performs calculations on those coordinates to align the windows. The computer system also includes a mouse 210 and a keyboard 220 with which a user may position and size the windows. The computer system further includes a display 230 which is the computer screen on which the windows are displayed.

The computer 200 has a memory 202, a central processing unit (CPU) 204 and an I/O (input/output) unit 206. The memory 202 stores an operating system which is executed by the CPU 204. In a preferred embodiment, the operating system executed by the CPU 204 is the Microsoft WINDOWS operating system. The WINDOWS operating system is described in "Programming Windows," written by Charles Petzold and published by Microsoft Press, which is hereby incorporated by reference.

The memory 202 also contains a tiling program which performs methods of a preferred embodiment when executed by the CPU 204. When the user indicates via the mouse 210 or the keyboard 220 that the existing windows are to be tiled, the operating system controls the CPU 204 to execute the tiling program to align the windows. As will be explained, the tiling program aligns the windows based on the relative position and size of the windows when the request is made. The tiling program aligns the windows by calculating new coordinates of the windows and providing the new coordinates to the operating system. The operating system then displays the aligned windows on the display 230 based on the new coordinates.

Figure 3:
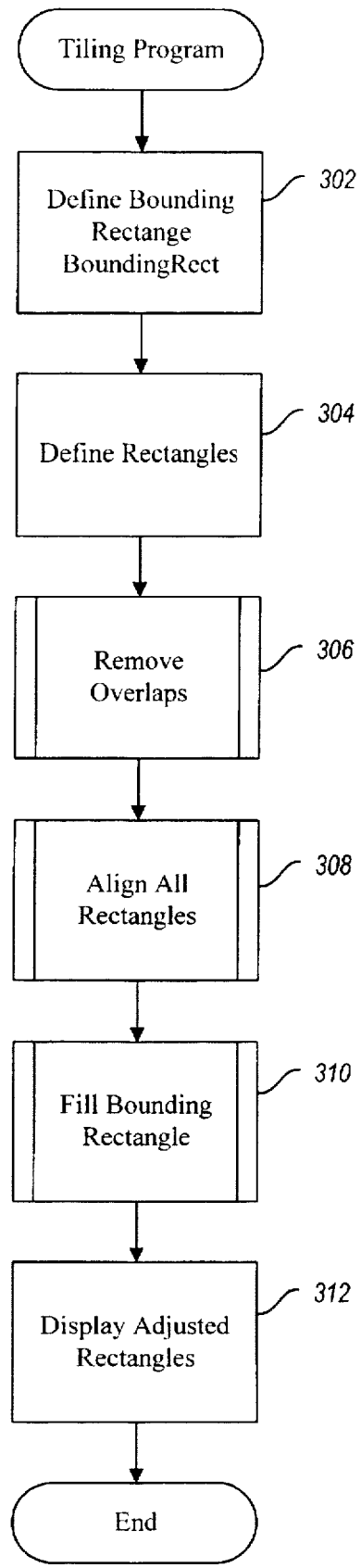
FIG. 3 is a flow diagram of a preferred tiling program.

The tiling program which performs the method of the preferred embodiment is shown in FIG. 3. The tiling program is executed by the computer 200. The tiling program aligns the windows so that their sides touch and so that they fill a bounding window (e.g., the entire computer screen) within which they are currently displayed. In accordance with a preferred embodiment, the tiling program aligns the windows so as to approximate the relative position and size of the currently displayed windows.

In step 302, the tiling program initially determines the bounding window (or bounding rectangle) within which the windows are currently displayed. In a preferred embodiment, the windows and bounding window are rectangular. One of ordinary skill in the art, however, may adapt the principles of the present invention as described herein with reference to the preferred embodiment to align windows of other shapes.

The tiling program obtains from the operating system the coordinates of the bounding window and stores these coordinates in a data structure "BoundingRect" 400, shown in FIG. 4. The operating system defines the position and size of each window by the coordinates of each window side (i.e., top, bottom, left, right). The tiling program stores the bounding window coordinates in BoundingRect.Top, BoundingRect.Bottom, BoundingRect.Left, and BoundingRect.Right.

In step 304, the tiling program retrieves from the operating system the coordinates of each window currently displayed. The coordinates are stored in an array of data structures called "Rectangles" 410, as shown in FIG. 4. These coordinates are stored in array entries Rectangles|x|.Top 422, Rectangles|x|.Bottom 423, Rectangles|x|.Left 424, and Rectangles|x|.Right 425. Each array entry Rectangles|x| 420 also contains flags Rectangles|x|.TopMoved 426, a Rectangles|x|.BottomMoved 428, a Rectangles|x|.LeftMoved 430 and a Rectangles|x|.RightMoved 432 that are used to track the movements of sides. Finally, each array entry Rectangles|x| 420 contains a flag Rectangles|x|.Ignore 434 which indicates whether the corresponding window is to be ignored during window alignment.

Figure 1A:
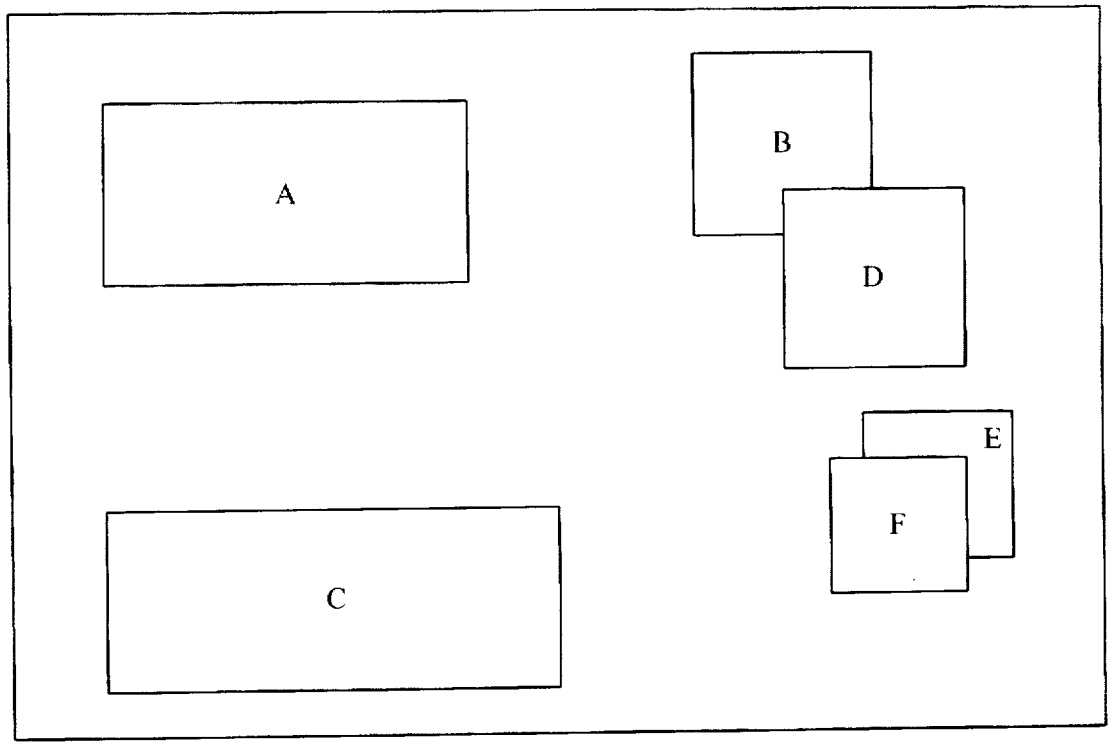
FIGS. 1A and 1B are illustrations of the display screen before and after a prior art tiling method is employed.
Figure 1B:
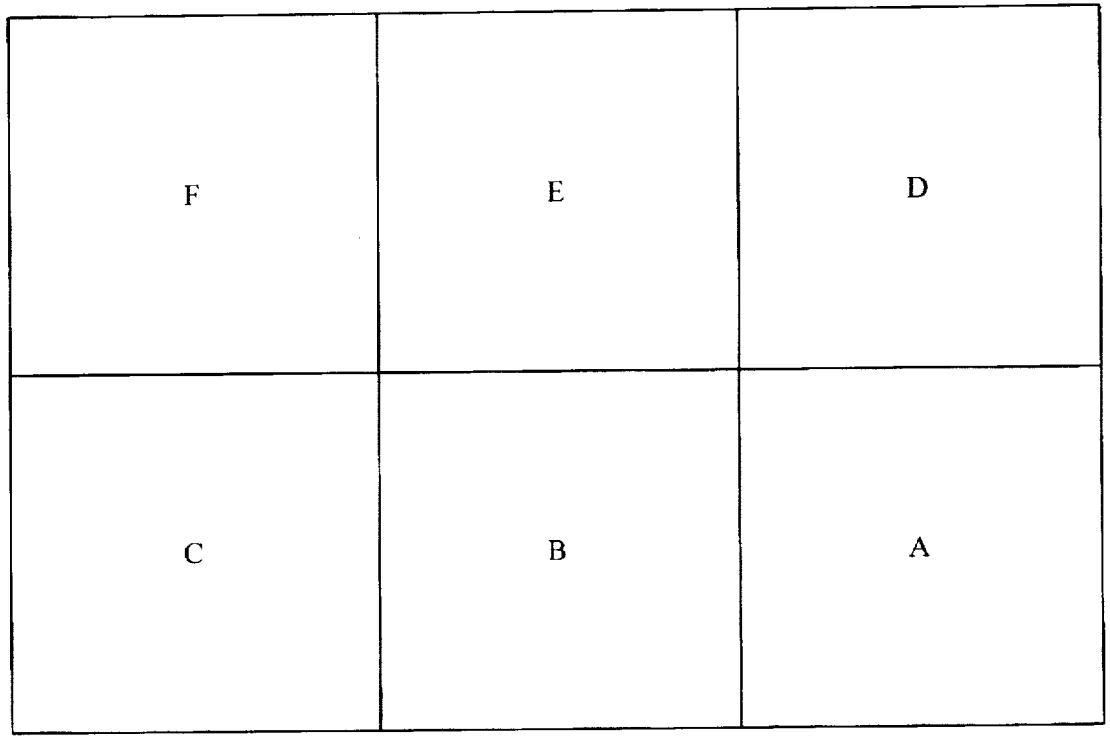
Figure 5A:
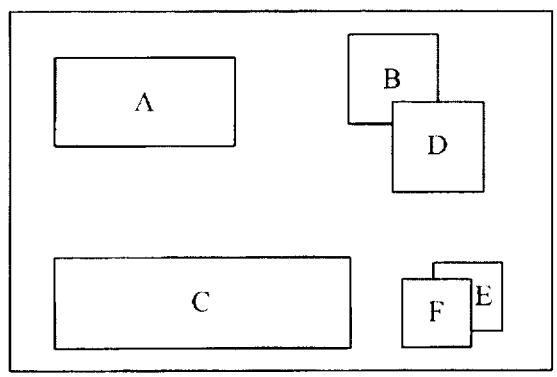
FIGS. 5A through 5F are illustrations of the display screen before, during, and after tiling of windows.
Figure 5B:
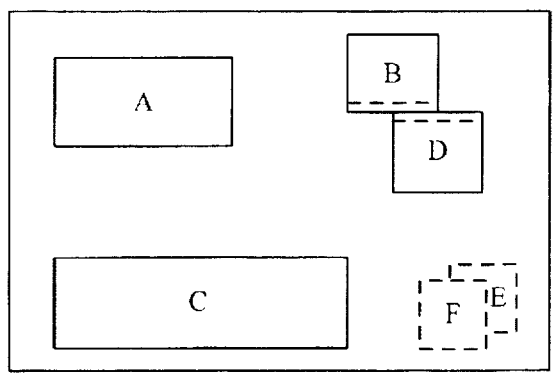

In step 306, the tiling program removes secondary overlaps. An example of the removal of secondary overlaps among windows is illustrated in FIGS. 5A and 5B. FIG. 5A shows a display screen initially including windows A–F, as were shown in FIG. 1A. FIG. 5B shows windows A–F after the overlaps have been removed.

The RemoveOverlaps routine removes secondary overlaps by adjusting the sides of the overlapping windows. For all windows that form a primary overlap, the RemoveOverlaps routine sets the corresponding flag Rectangles|x|.Ignore 434 to TRUE to indicate that the window is not to be adjusted. In the preferred embodiment, a primary overlap occurs when one window overlaps the center point of another window. Otherwise, an overlap is a secondary overlap. One skilled in the art would appreciate that other criteria for primary overlaps may be used. For example, a primary overlap may be defined in terms of percentage of overlap area. As shown in FIG. 5A, the overlap between windows E and F is primary, while the overlap between windows B and D is secondary. Thus, the RemoveOverlaps routine adjusts the side of windows B and D, as shown in FIG. 5B, and designates windows E and F to be ignored, as indicated with dotted lines in FIG. 5B.

After the tiling program has removed the secondary overlaps, the tiling program aligns the windows in step 308. The tiling program aligns the windows by aligning each window with each other window where such an alignment is possible without causing an overlap among the windows. A window is aligned with another window by moving "opposing sides" (nearest parallel sides) preferably to a mid point between the sides. The tiling program does this by invoking the routine "ALignAllRectangles." The AlignAllRectangles routine takes each pair of windows and aligns opposing sides of the pair of windows, unless one of the windows are marked to be ignored or an overlap would be caused. In a preferred embodiment, the flags TopMoved, BottomMoved, LeftMoved or RightMoved are used to track whether a side of a window has been moved. Further movement of the side will result in an overlap so sides are only moved once.

In a preferred embodiment, if neither opposing side has been moved, then each opposing side is moved to a midpoint between the opposing sides so long as no overlap results. If an overlap would occur, then either side is moved to the opposing side so long as no overlap occurs. If, however, one opposing side has already been moved, then the other opposing side is moved to the opposing side that has already been moved so long as no overlap results.

Figure 5C:
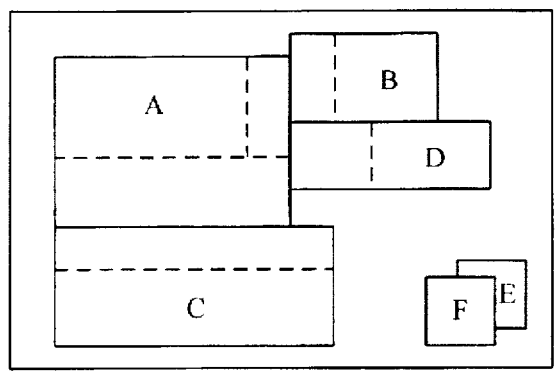
Figure 5D:
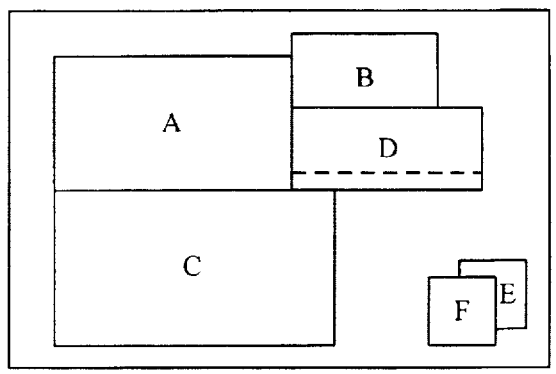

The alignment of windows performed by the AlignAllRectangles routine is in FIGS. 5B, 5C, and 5D. Window A is first selected for alignment with the other windows, so that windows A and B, windows A and C, and windows A and D are first aligned from the positions shown in FIG. 5B to that shown in FIG. 5C. Windows A and B are aligned by aligning the right side of window A with the left side of window B (the opposing sides) as shown. Because the right side of window A and the left side of window B have not been moved, the opposing sides are moved to a midpoint location, as shown in FIG. 5C. Windows A and C are similarly aligned. Windows A and D are aligned by moving the left side of window D to the right side of window A, which has already been moved.

Window B is next selected for alignment with the other windows with which it has not been aligned. Thus, windows B and C and windows B and D are aligned beginning with windows B and C. However, aligning the bottom side of window B with the top side of window C would create an overlap with windows A and D, thus, is not performed. Windows B and D are also not aligned because the bottom side of window B and the top side of window D have already been moved when the secondary overlaps were removed.

Finally, window C is selected for alignment with window D. Windows C and D are aligned from the positions shown in FIG. 5C to the positions shown in FIG. 5D. Since the top side of window C has already been moved, windows C and D are aligned by moving the bottom side of window D to the location of the top side of window C.

After the tiling program has aligned the windows, the tiling program fills the bounding window with the aligned windows in step 310. The tiling program fills the bounding window by invoking the "FillBoundingRectangle" routine. The FillBoundingRectangle routine fills the bounding window with the aligned windows by moving the sides of each window to the corresponding side of the bounding window unless an overlap results. This process is illustrated with respect to FIGS. 5D and 5E. The top and left sides of window A are moved to the top and left sides of the bounding window, respectively. However, the bottom side of window A is not moved to the bottom side of the bounding window because an overlap would result between window A and window C. Similarly, the right side of window A is not moved to the right side of the bounding window because an overlap would result between window A and window B and between window A and window D. Windows B, C and D are expanded to fill the bounding window in a similar manner, as shown in FIG. 5E.

Figure 5E:
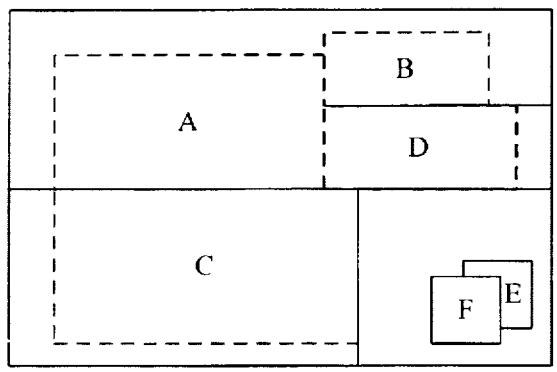

In the embodiment shown in FIG. 5E, window C is not expanded rightward over windows E and F. Instead, windows E and F remain in their original, untiled form. However, in an alternate embodiment, windows E and F are removed and window C is expanded rightward to fill the bounding rectangle.

Figure 5F:
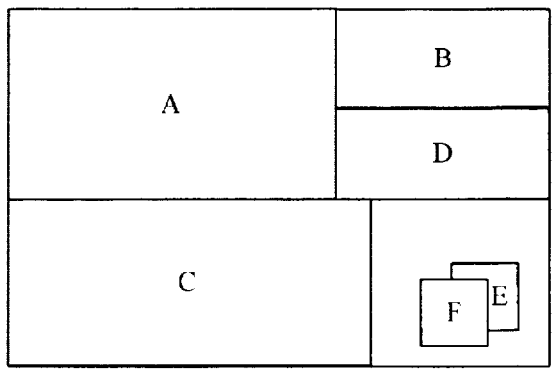

Finally, the tiling program displays the windows in step 312. FIG. 5F illustrates the display area finally displayed.

Figure 6:
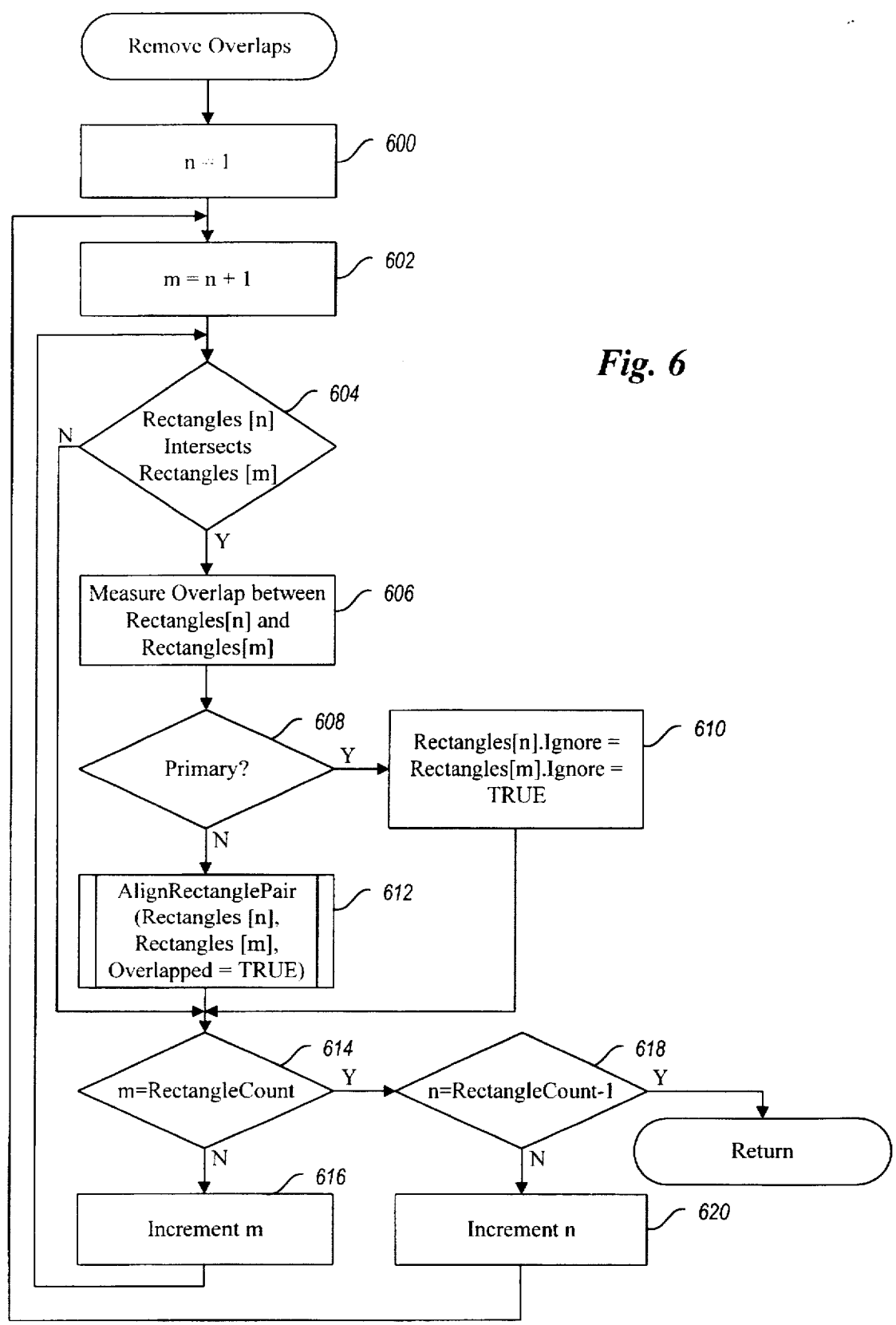
FIG. 6 is a flow diagram of the "RemoveOverlaps" routine.

The routines invoked by the tiling program of FIG. 3 are described in the following. A flow diagram of the RemoveOverlaps routine is shown in FIG. 6. The RemoveOverlaps routine removes secondary overlaps among the windows prior to their alignment. The RemoveOverlaps routine compares each pair of windows described by the Rectangles array and determines whether an overlap exists between the pair. If a primary overlap is found, then the RemoveOverlaps routine designates the overlapping windows to be ignored when later alignment is performed. If a secondary overlap is found, then the RemoveOverlaps routine removes the overlap.

In step 600, the RemoveOverlaps routine initially sets the index n equal to 1. Index n is an index to the Rectangles array and is used to select each window for removal of overlaps. In step 602, the RemoveOverlaps routine initial-izes the index m to equal n+1. Once a window is selected for removal of overlaps, index m is used to designate the windows with which the selected window is to be checked for overlaps. In step 604, the RemoveOverlaps routine determines whether the window n (the window represented by Rectangles [n]) intersects the window m. Thus, the first time step 604 is performed, the routine determines whether window 1 and window 2 overlap. The RemoveOverlaps routine preferably makes this determination by calling a function "IntersectRect" provided by the operating system. The IntersectRect function returns the coordinates of a window representing the intersection between these two windows if an intersection exists, and returns a zero if such an intersection does not exist.

If window n and window m do intersect, then control proceeds to step 606, else control branches to step 614. In step 606, the RemoveOverlaps routine measures the overlap between window n and window m, and in step 608 the RemoveOverlaps routine determines whether the measured overlap is a primary overlap. If the overlap is primary, then control branches to step 610, else control proceeds to step 612. In step 610, the RemoveOverlaps routine designates the overlapping windows to be ignored in performing later alignments. The RemoveOverlaps routine so designates the windows by setting the Ignore flags in the Rectangles array for entries indexed by n and m and control proceeds to step 614.

In step 612, the routine AlignRectanglePair is invoked. The AlignRectanglePair routine aligns the overlapping sides of window n and window m, as described below in detail. In step 614, the RemoveOverlaps routine determines whether the index m is equal to index value of the last window (RectangleCount), which is the total number of windows. If so, then control proceeds to step 618, else control proceeds to step 616. In step 616, the index m is incremented and control loops to step 604. In step 618, the RemoveOverlaps routine determines whether the index n has reached the index value of the next-to-last window (RectangleCount-1). If so, then the routine returns, else the control proceeds to step 620. In step 620, the index n is incremented in step 620 and control then loops to step 602, where the index m is reinitialized to n+1.

Figure 7:
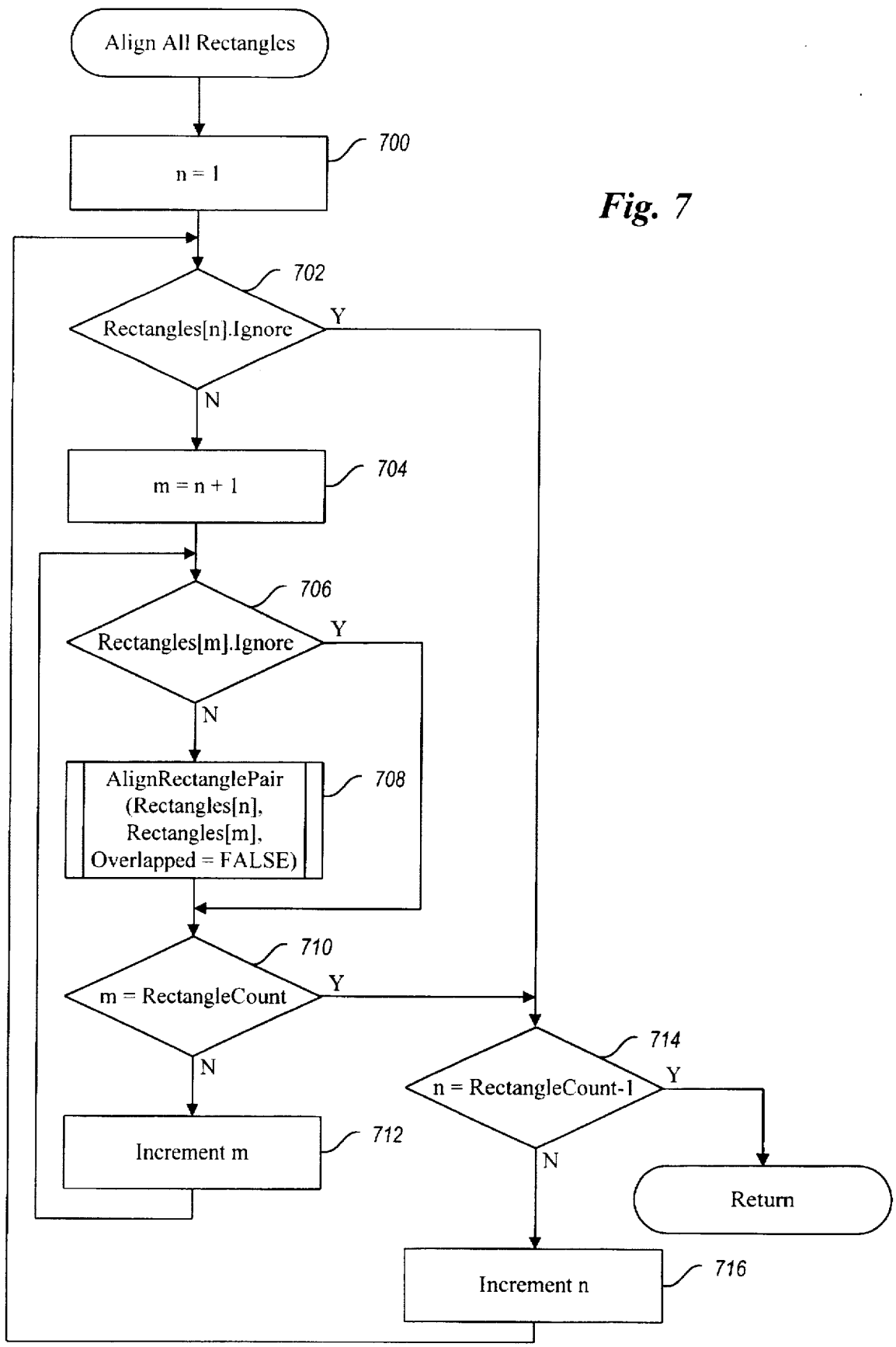
FIG. 7 is a flow diagram of the "AlignAllRectangles" routine.

A flow diagram of the AlignAllRectangles routine is shown in FIG. 7. The AlignAllRectangles routine aligns all the windows (except for those which have been designated to be ignored). In step 700, the AlignAllRectangles routine initially sets the value of index n equal to 1. Index n is used to select each window represented in the Rectangles array. In step 702, the AlignAllRectangles routine determines whether window n has been designated to be ignored. If so, then window n is not aligned and control branches to step 714, else control proceeds to step 704.

In step 704, the value of index m is initialized to n+1. Index m is used to designate each window with which the selected window is to be aligned. In step 706, the AlignAll-Rectangles routine determines whether window m has been designated to be ignored. If so, control proceeds to step 710, else control proceeds to step 708.

In step 708, the AlignAllRectangles aligns window n and window m by invoking the AlignRectanglePair routine. The AlignRectanglePair routine aligns the opposing sides of window n and window m, which is described in detail below. In step 710, the index m is equal to index value of the last window (RectangleCount), then control branches to step 714, else control proceeds to step 712. In step 712, index m is incremented and then control loops to step 706 to align the next pair of windows. In step 714, if index n is equal to index value of the next-to-last window (RectangleCount-1), then the routine returns, else control proceeds to step 716. In step 716, index n is incremented, and control loops to step 702 to align the next pair of windows.

Figure 8:
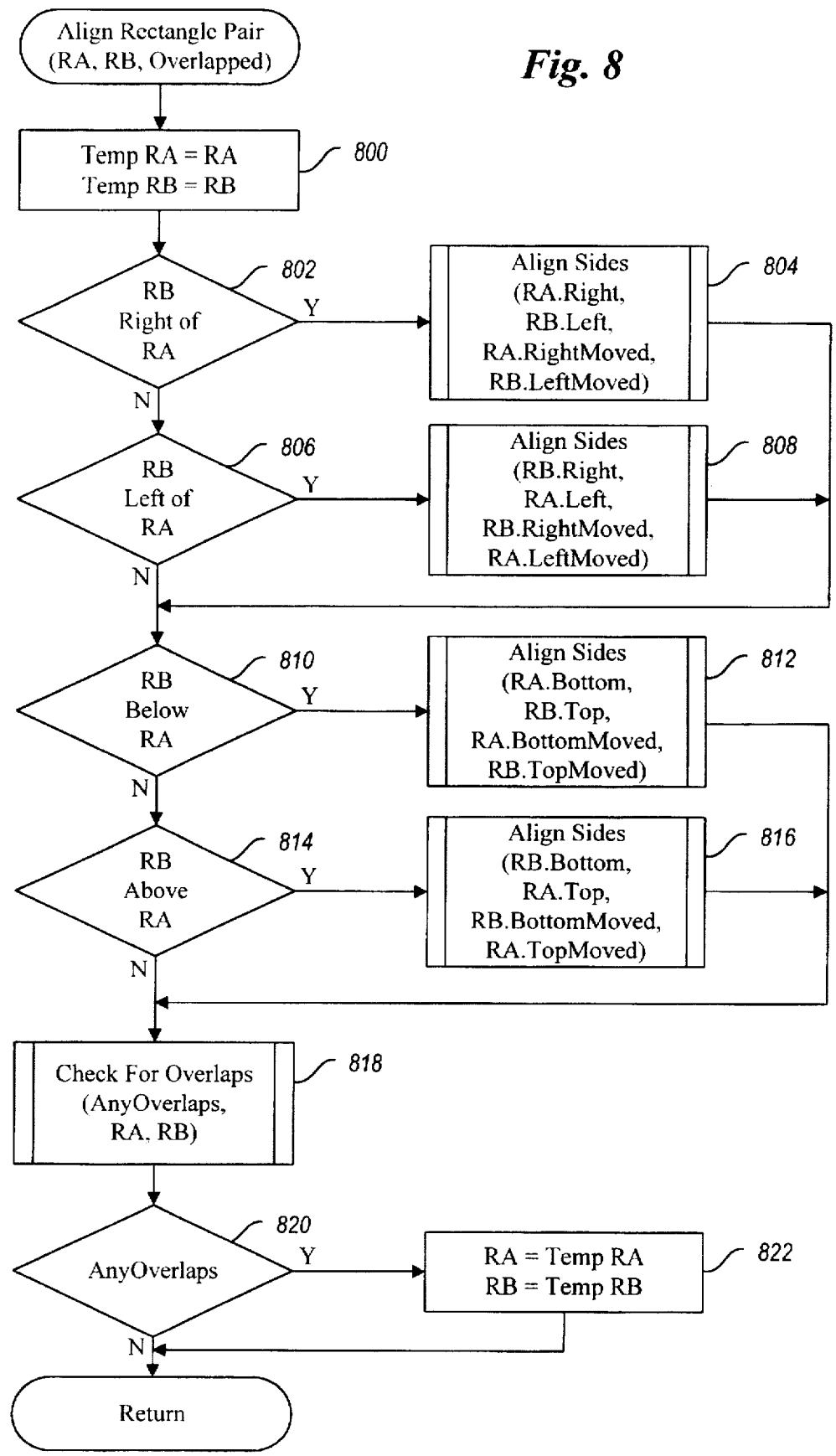
FIG. 8 is a flow diagram of the "AlignRectanglePair" routine.

A flow diagram of the AlignRectanglePair routine is shown in FIG. 8. The AlignRectanglePair routine aligns two passed windows (denoted as RA and RB) based on whether the passed flag (overlapped) indicates whether the pair of windows overlap. This routine is called by the routine to remove overlaps and the routine to align window pairs. As shown in FIGS. 5A and 5B, this routine removes the overlap of windows B and D. Also, as shown in FIGS. 5A and 5C, this routine aligns non-overlapping windows, such as windows A and C. In step 800, the AlignRectanglePair routine saves the coordinates of window RA (RA.Top, RA.Bottom, RA.Left, RA.Right) and window RB (RB.Top, RB.Bottom, RB.Left, RB.Right) temporary values TempRA and TempRB along with the moved flags (e.g., RA.TopMoved) The temporary values are restored if a movement of a side results in an overlap. In step 802, the AlignRectanglePair routine determines whether the window RB is "right of" the window RA. Window RB is "right of" window RA as determined in accordance with the following pseudocode. (The pseudocode assumes a coordinate system where the top, left corner of the computer screen is (0,0) increases to the bottom and right.)

```
if RB.Right ≥ RA.Right then
    if (Overlapped) then
        RB is "right of" RA when
            ((Intersection(RA,RB) .Right - Intersection(RA,RB) Left)≦
            (Intersection(RA,RB) .Bottom - Intersection(RA,RB) .Top))
    else
        RB is "right of" RA when
            (RB.Left ≥ RA.Right)
    endif
endif
```

As illustrated by the pseudocode, window RB can only be "right of" window RA when some portion of window RB is to the right of window RB as determined by the condition RB.Right≧RA.Right. The AlignRectanglePair routine uses two different tests for determining whether window RB is "right of" window RA based on whether the windows overlap. The parameter "Overlapped" is set to be TRUE when the AlignRectanglePair routine is called by the RemoveOverlaps routine of FIG. 6 and set to be FALSE when the AlignRectanglePair routine is called by the AlignAllRectangles routine of FIG. 7. When the AlignRectanglePair routine is called by the AlignAllRectangles routine, the AlignRectanglePair routine is called only to align non-overlapping windows (Overlapped=FALSE). This is because all secondary overlaps have been removed previously by the RemoveOverlaps routine (windows having primary overlaps are ignored). Thus, window RB is only "right of" window RA when the left side of window RB is right of the right side of window RA as determined by the condition RB.Left≧RA.Right.

When the AlignRectanglePair routine is called by the RemoveOverlaps routine to align two overlapping windows (Overlapped=TRUE), the windows are preferably only aligned in the direction (vertical or horizontal) having the least overlap. For example, windows B and D of FIG. 5A are only aligned vertically and not horizontally. The right side of window RA is aligned with the left side of window RB preferably only when the vertical side of the intersecting window is greater than the horizontal side of the intersecting window. Window RB is only determined by the condition ((Intersection(RA,RB).Right-Intersection(RA,RB).Left)< (Intersection(RA,RB).Bottom-Intersection(RA,RB).Top). The AlignRectanglePair routine determines the intersecting window that defines the intersection of windows RA and RB (Intersection RA, RB) by invoking the IntersectRect function.

If the AlignRectanglePair routine determines in step 802 that window RB is "right of" window RA, then control branches to step 804, else control proceeds to step 806. In step 804, the AlignRectanglePair routine invokes the AlignSides routine, which is described below in detail and then continues at step 810. The AlignSides routine aligns a passed side of one window with a passed side of another window where possible without moving a previously moved side or causing an overlap. The AlignSides routine also returns an indication of whether each side has been moved in performing this alignment. The AlignRectanglePair routine passes the AlignSides routine the right side of window RA (RA.Right) and the left side of the window RB (RB.Left) and the indications of whether the aligned sides have been moved (RA.RightMoved and RB.LeftMoved).

In step 806, the AlignRectanglePair routine determines whether the window RB is "left of" the window RA. The AlignRectanglePair routine performs this determination in a manner similar to the determination of whether the window RB was "right of" the window RA. Window RB is "left of" window RA as determined in accordance with the following pseudocode.

```
if RB.Left ≦ RA.Left then
    if (Overlapped) then
        RB is "left of" RA when
            ((Intersection(RA,RB) .Right - Intersection(RA,RB) .Left) ≦
            (Intersection(RA,RB) .Bottom - Intersection(RA,RB) .Top))
    else
        RB is "left of" RA when
            (RB.Right ≦ RA.Left)
    endif
endif
```

In step 806, window RB is "left of" window RA, then control proceeds to step 808, else control proceeds to step 810. In step 808, the AlignRectanglePair routine invokes the AlignSides routine, passing the right side of window RB (RB.Right) and the left side of window RA (RA.Left) and the corresponding moved flags.

In step 810, the AlignRectanglePair routine determines whether window RB is "below" window RA. Window RB is "below" window RA as determined in accordance with the following pseudocode.

```
if (RB.Bottom ≥ RA.Bottom) then
    if (Overlapped) then
        RB is "below" RA when
            ((Intersection(RA,RB) .Bottom - Intersection(RA,RB) .Top) ≦
            (Intersection (RA,RB) .Right - Intersection(RA,RB) .Left))
    else
        RB is "below" RA when
            (RB.Top ≥ RA.Bottom)
    endif
endif
```

If window RB is "below" window RA, then control branches to step 812, else control branches to step 814. In step 812, the AlignRectanglePair routine invokes the AlignSides routine, passing the bottom side of window RA (RA.Bottom) and the top side of window RB (RB.Top) and the corresponding moved flags.

In step 814, the AlignRectanglePair routine determines whether window RB is "above" window RA. Window Rb is "above" window RA as determined in accordance with the following pseudocode.

```
if (RB.Top ≦ RA.Top) then
    if (Overlapped) then
        RB is "above" RA when
            ((Intersection(RA,RB) .Bottom - Intersection(RA,RB) .Top) ≦
            (Intersection(RA,RB) .Right - Intersection(RA,RB) .Left))
    else
        RB is "above" RA when
            (RB.Bottom ≦ RA.Top)
    endif
endif
```

If window RB is "above" window RA, then control branches to step 816, else control branches to step 818. In step 816, the AlignRectanglePair routine invokes the AlignSides routine, passing the bottom side of window RB (RB.Bottom) and the top side of window RA (RA.Top) along with the corresponding move flags.

In step 818, the AlignRectanglePair routine invokes the CheckForOverlaps routine. The CheckForOverlaps routine determines whether an overlap exists among any of the windows as a result of the alignment of windows RA and RB. In step 820, if an overlap has been caused by the alignment of window RA and window RB, then control branches to step 822, else the routine returns. In step 822, the AlignRectanglePair routine resets the coordinates and moved flags of windows RA and RB to their original values before alignment (TempRA and TempRB) and the routine returns. Alternatively, a check for overlap could be performed after the vertical alignment of steps 802–808 and after the horizontal alignment of steps 810–816, in which case the left and right or top and bottom coordinates could be selectively restored.

Figure 9:
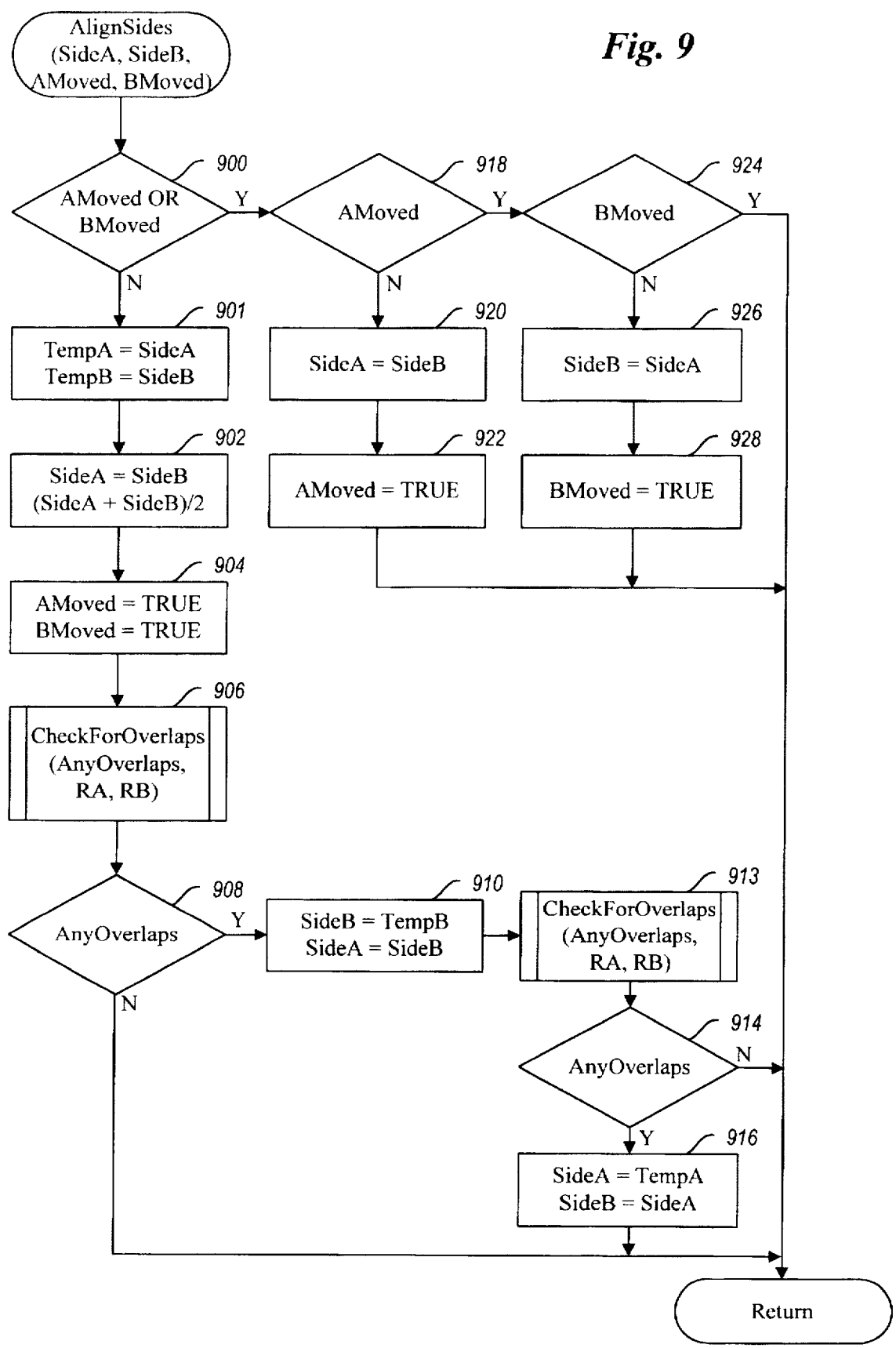
FIG. 9 is a flow diagram of the "AlignSides" routine.

A flow diagram of the AlignSides routine is shown in FIG. 9. The AlignSides routine aligns a passed side of one rectangle with a passed side of another rectangle (denoted SideA and SideB) where possible without moving a side that has previously been moved or causing an overlap. In step 900, if either side to be aligned has been moved based on the passed moved flags (denoted AMoved and BMoved), then the AlignSides routine branches to step 918, else the AlignSides routine branches to step 901. In step 901, the AlignSides routine saves the coordinates and moved flags of SideA and SideB to temporary values (TempA and TempB). In step 902, the AlignSides routine sets SideA and SideB to an average value of SideA and SideB, which represents a midpoint location between SideA and SideB. In step 904, the AlignSides routine sets the flags AMoved and BMoved to be TRUE.

In step 906, the AlignSides routine invokes the CheckForOverlaps routine to determine whether an overlap results from the movement of SideA and SideB. In step 908, if the AlignSides routine determines that an overlap has resulted from moving SideA and SideB, then control proceeds to step 910, else the routine returns. In steps 910–916, the AlignSides routine checks to see if SideA can be moved to SideB or vice-versa without resulting in an overlap. In step 910, the AlignSides routine resets SideB to its original value (TempB), sets BMoved to FALSE, and sets SideA to SideB. In step 912, the AlignSides routine determines whether any overlaps exist among the windows. If an overlap results from moving SideA to SideB, then control proceeds to step 916, else the routine returns. In step 916, the AlignSides routine resets SideA to its original value (TempA), sets AMoved to FALSE, sets BMoved to TRUE, sets SideB to SideA, and then returns.

In step 918, if SideA has been moved, then control proceeds to step 924, else control proceeds to step 920. In steps 920 and 922, the AlignSides routine moves SideA to SideB, sets AMoved to TRUE, and then returns. In step 924, if SideB has been moved, then the routine returns, else control branches to step 926. In steps 926 and 928, the AlignSides routine moves SideB to SideA, sets BMoved to TRUE, and then returns.

Figure 10:
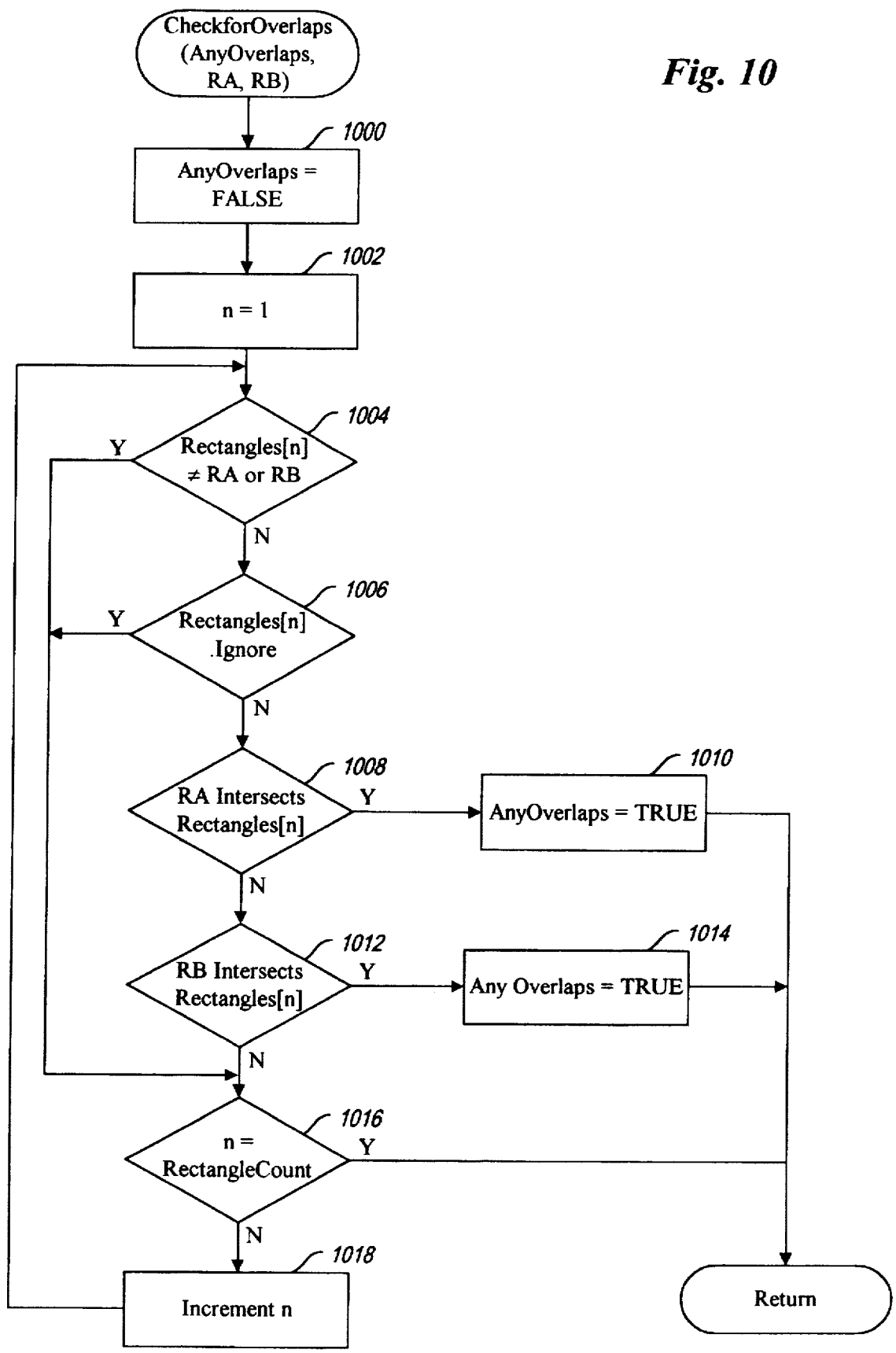
FIG. 10 is a flow diagram of the "CheckForOverlaps" routine.

A flow diagram of the CheckForOverlaps routine is shown in FIG. 10. The CheckForOverlaps routine determines whether an overlap exists between the two passed windows and any of the windows. The routine compares the two passed windows to all of the other windows for overlaps and, if an overlap results, returns TRUE in the variable AnyOverlaps. In step 1000, the variable AnyOverlaps is initially set to FALSE. In step 1002, the CheckForOverlaps routine sets the value of index n to one. Index n is used to select each window to check for overlaps. In step 1004, window n is compared to windows RA and RB to ensure that the windows RA and RB are not the same as windows n, and thus will not be tested against themselves in determining whether an overlap exists. If window n is different from windows RA and RB, then control proceeds to step 1006, else control branches to step 1016.

In step 1006, if the window n has been designated to be ignored, then the routine branches to step 1016, else control proceeds to step 1008. In step 1008, if the window RA intersects window n, then control branches to step 1010, where the variable AnyOverlaps is set to be TRUE and the routine returns, else control proceeds to step 1012. The CheckForOverlaps routine determines whether window RA intersects window n by invoking the function IntersectRect passing window RA and window n.

In step 1012, if the window RB intersects window n, then control branches to step 1014 where the variable AnyOverlaps is set to TRUE and the routine returns, else the control proceeds to step 1016. In step 1016, if the index n is equal to the index value of the last window (RectangleCount), then the routine returns, else control proceeds to step 1018. In step 1018, index n is incremented and control then loops to step 1004 to check the next window for overlaps.

Figure 11:
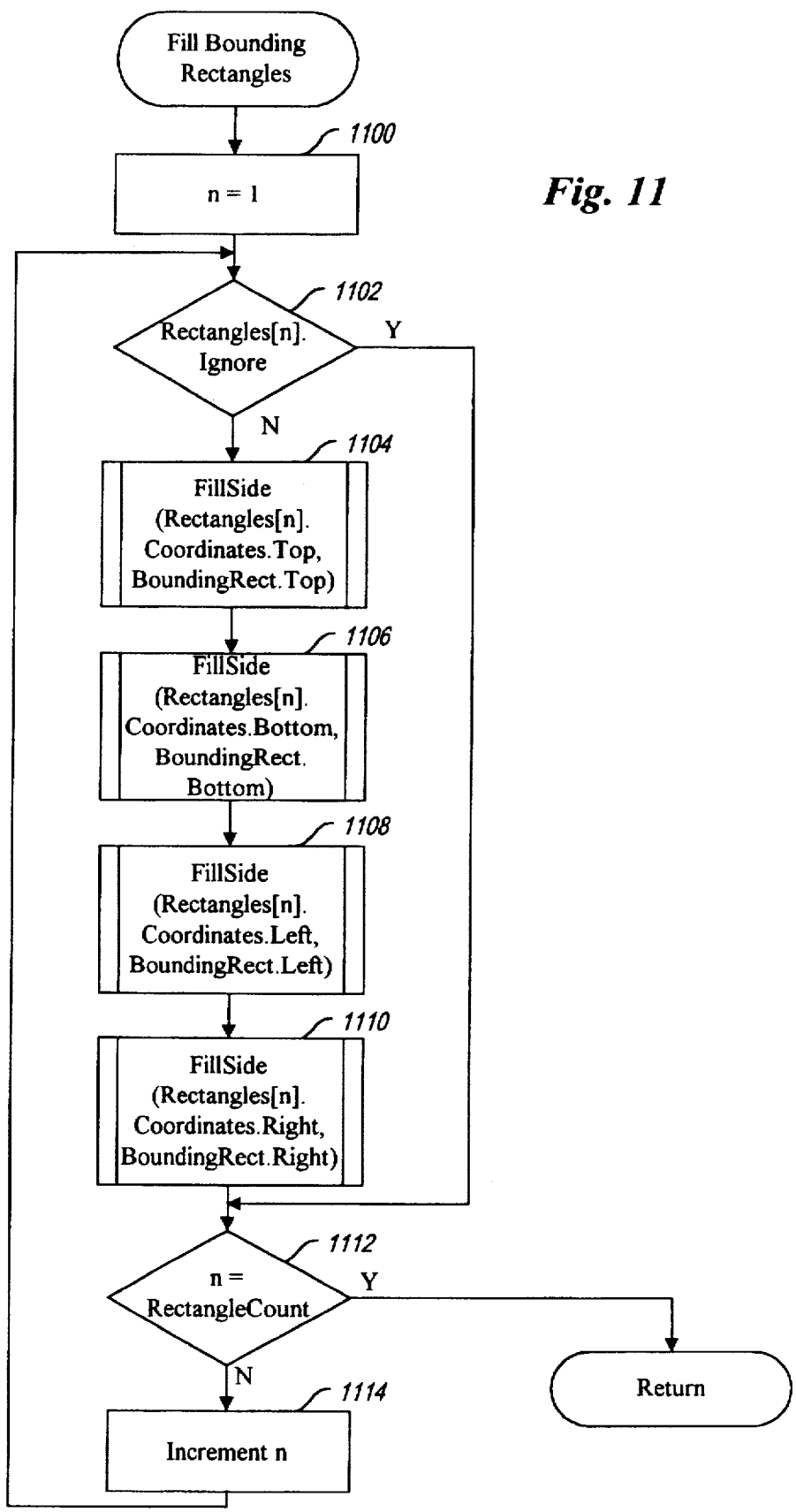
FIG. 11 is a flow diagram of the "FillBoundingRectangle" routine.

A flow diagram of the routine FillBoundingRectangle is shown in FIG. 11. The FillBoundingRectangle routine selects each window not previously designated to be ignored and attempts to move each side of the window to a corresponding side of the bounding window. In step 1100, the FillBoundingRectangle routine sets the index n to 1. Index n is used to select each of the windows. In step 1102, if window n has been designated to be ignored, then control branches to step 1112, else control proceeds to step 1104.

In step 1104, the FillBoundingRectangle routine invokes the FillSide routine passing the top side of window n (Rectangles [n].Top) and the top side of the bounding window (BoundingRect.Top). The FillSide routine moves a passed side of a window to a passed side of the bounding window where possible without creating an overlap. In step 1106, the FillBoundingRectangle routine invokes the FillSide routine, passing the bottom side of window n and the bottom side of the bounding window. In step 1108, the FillBoundingRectangle routine invokes the FillSide routine, passing the left side of window n and the left side of the bounding window. In step 1110, the FillBoundingRectangle routine invokes the FillSide routine passing the right side of window n and the right side of the bounding window. In step 1112, if the index n is equal to the index value of the last window (RectangleCount), then routine returns, else control proceeds to step 1114 where the value of index n is incremented, and control loops to step 1102.

Figure 12:
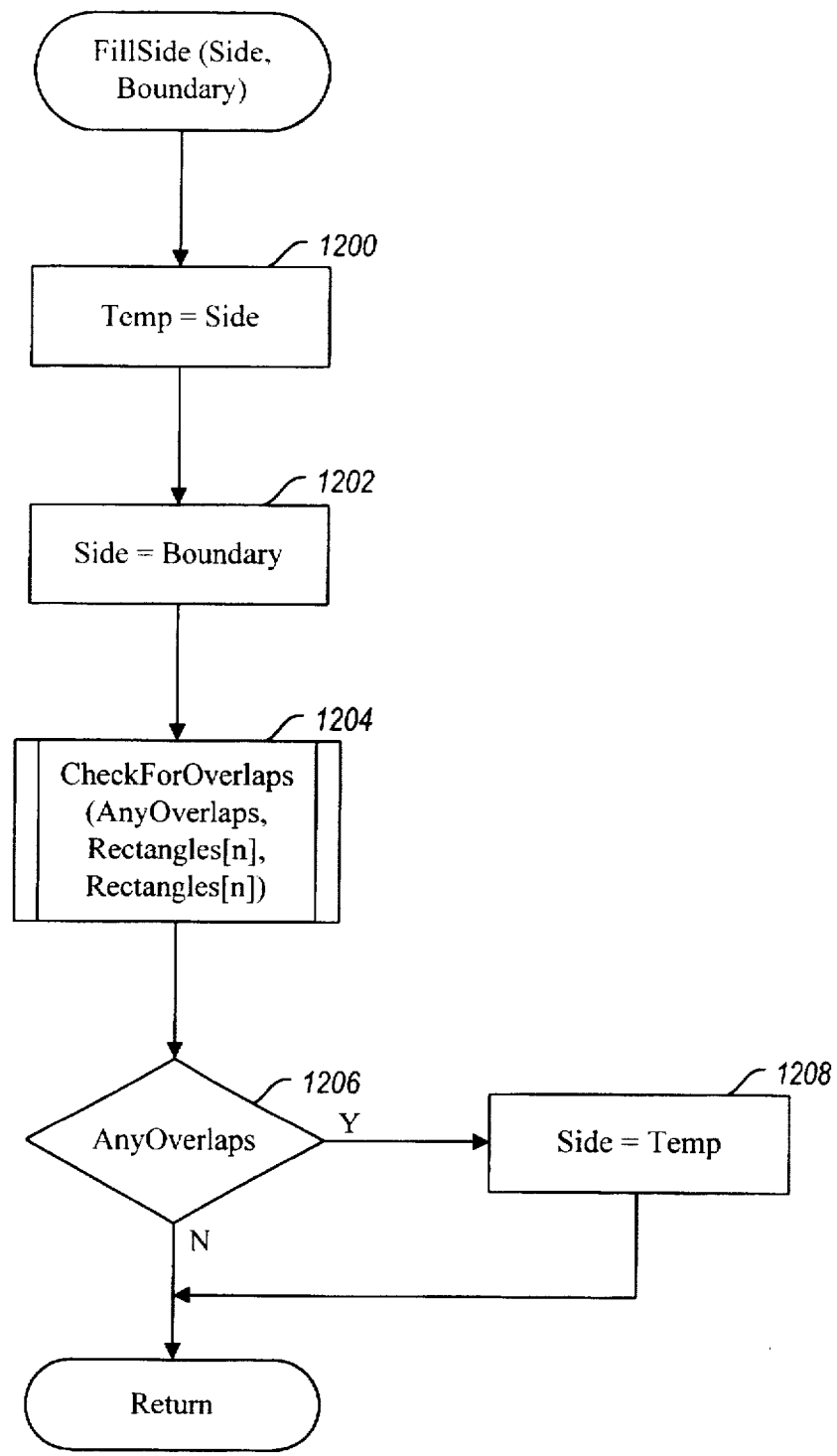
FIG. 12 is a flow diagram of the "FillSide" routine.

A flow diagram of the FillSide routine is shown in FIG. 12. The FillSide routine moves the passed side of a window (Side) to the passed Side of a bounding window (Boundary). In step 1200, the FillSide routine saves the passed Side to a temporary value (Temp). In step 1202, the passed Side is moved to the location of the passed Boundary. In step 1204, the FillSide routine invokes the CheckForOverlaps routine to determine whether moving the passed Side to the passed Boundary has caused an overlap. In step 1206, if an overlap has resulted, then control branches to step 1208, else the routine returns. In step 1208, the passed Side is reset to its original position (Temp) and the routine then returns.

Figure 13A:
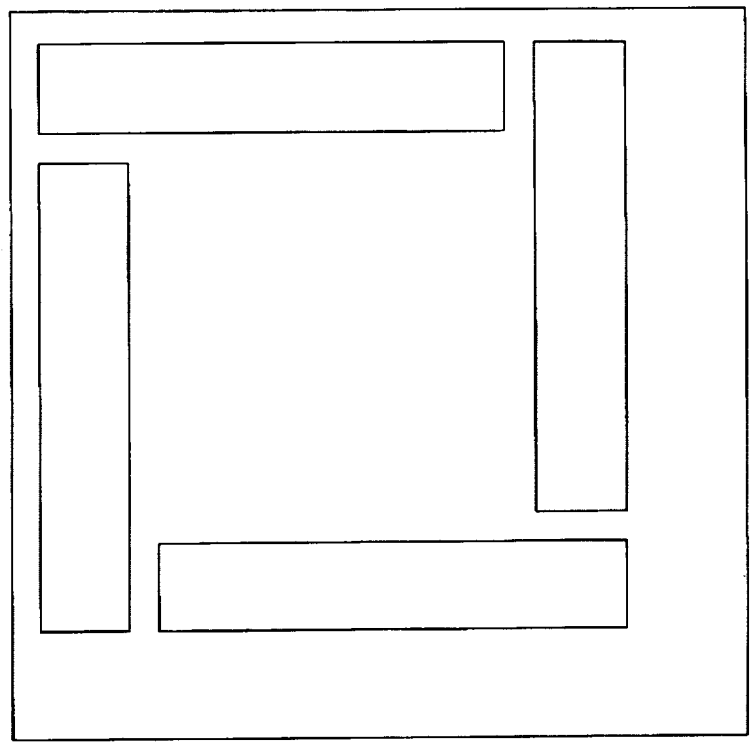
FIGS. 13A and 13B are illustrations of an alignment of windows arranged in a spiral.
Figure 13B:
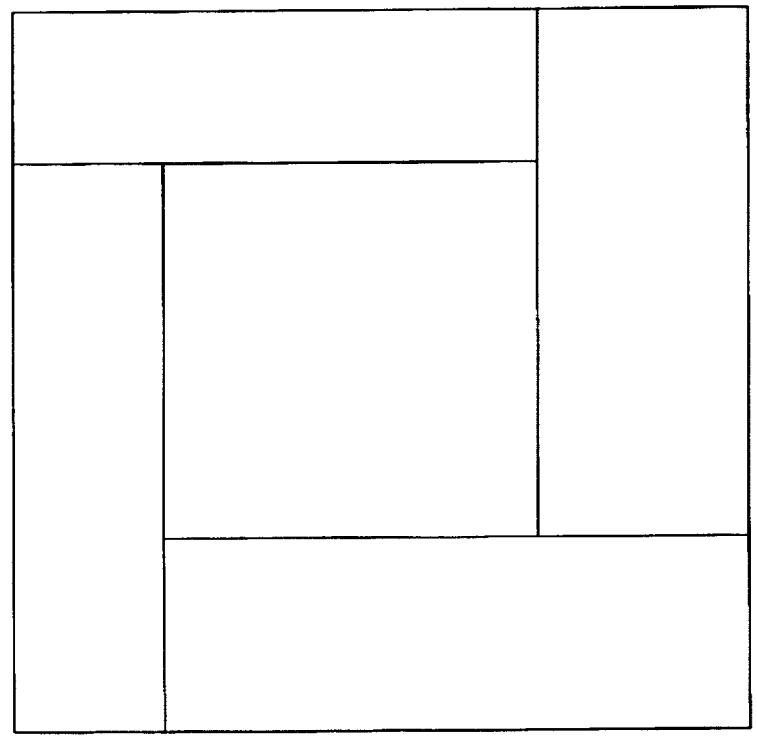
Figure 14A:
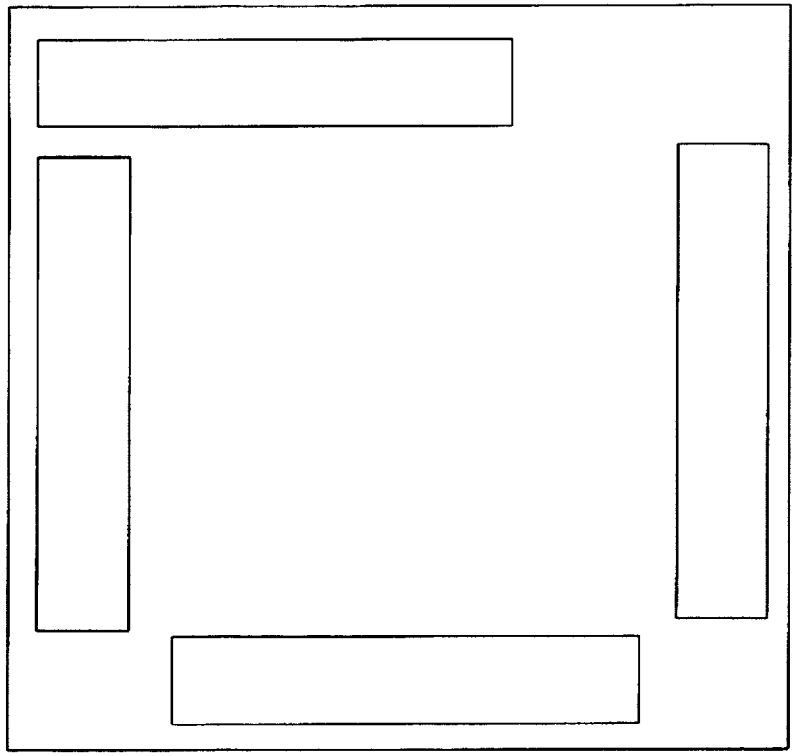
FIGS. 14A and 14B are illustrations of an alignment of windows previously arranged in a spiral but adjusted before alignment.
Figure 14B:
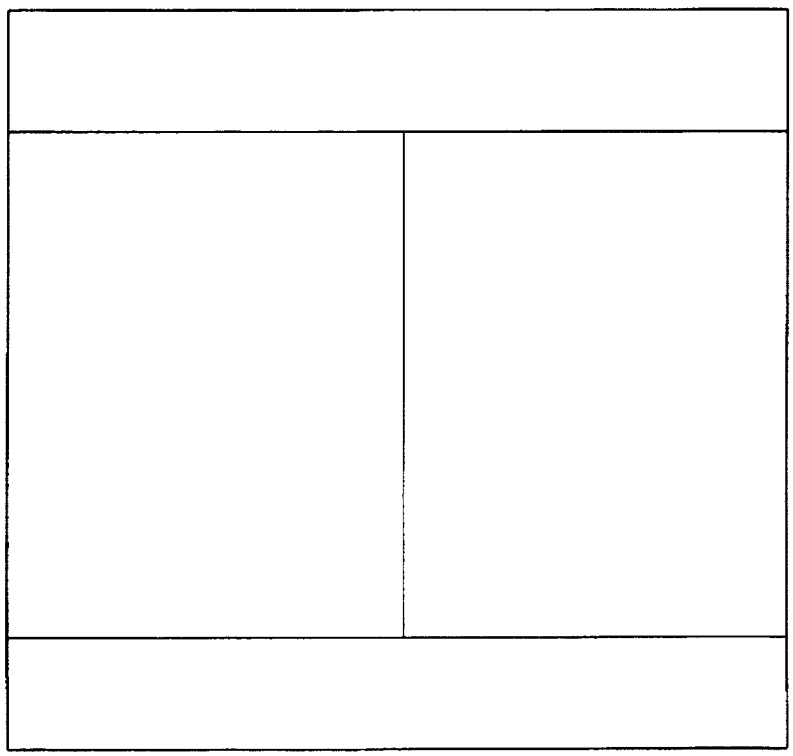

A preferred embodiment has been described in which overlaps among the windows are removed before their alignment so that they can be aligned efficiently thereafter. One having ordinary skill in the art will recognize that other special conditions in addition to overlapping windows may be handled by adjusting the windows prior to their alignment. For example, where windows are found to be arranged in a "spiral" as shown in FIG. 13A, one embodiment would align the windows as shown in FIG. 13B with an unoccupied space in the center. In an alternate embodiment, the system moves the windows as shown in FIG. 14A prior to aligning the windows. As a result, the windows are aligned as shown in FIG. 14B.

Although the present invention has been described with reference to one or more specific embodiments, it should be appreciated that various changes can be made by one of ordinary skill in the art without departing from the spirit of the invention. The scope of the invention is properly defined by the claims.

I claim:

1. A method, performed by a computer, of automatically aligning windows on a computer screen, the windows being currently displayed in a way that the windows are not aligned with each other, the method comprising the steps of:

determining a position on the computer screen of a first side of a first window;

determining a position on the computer screen of a first side of a second window, the first side of the second window not being aligned with the first side of the first window;

moving at least one of the first sides of the first and second windows to a new position different from the determined position of the first side being moved, the new position being sufficient to align the first side of the first window with the first side of the second window, and the new position being selected based on the positions determined for the first sides of the first and second windows before being moved to produce aligned first and second windows; and displaying the aligned first and second windows on the computer screen.

2. The method of claim 1, further comprising:

calculating a distance between the positions determined for the first sides; and wherein the moving step comprises moving the first side of each of the first and second windows to a position that is a predetermined portion of the distance calculated between the positions determined for the first sides.

3. The method of claim 1 wherein both determining steps and the moving steps are performed for alternate first and second windows on the computer screen, wherein the alternate first and second windows include at least one window that is not one of the first and second windows.

4. The method of claim 1 wherein the moving step comprises:

determining whether either of the first sides has been moved previously while automatically aligning the windows on the computer screen; and when neither of the first sides is determined to have been moved previously, moving each of the first sides to a midpoint position between the positions determined for the first sides.

5. The method of claim 4 wherein the moving step further comprises:

if the first side of the first window is determined to have been previously moved, then moving first side of second window to the position determined for the first side of the first window; and if the first side of the second window is determined to have been previously moved, then moving the first side of the first window to the position determined for the first side of the second window.

6. The method of claim 1, further comprising:

determining whether any of the windows would overlap if the moving step were performed to align the first sides of the first and second windows; and wherein the method includes the moving step only if it is determined that an overlap would not result among any of the windows.

7. The method of claim 6 wherein the moving step comprises moving, unless an overlap would result among any of the windows, the first side of the first window and the first side of the second window to a midpoint position between the positions determined for the first sides.

8. The method of claim 7 wherein the moving step comprises moving, if an overlap would result among any of the windows in moving the first sides to the midpoint location, the first side of the first window to the position determined for the first side of the second window.

9. The method of claim 8 wherein the moving step comprises moving, if an overlap would result among any of the windows in moving the first side of the first window to the position determined for the first side of the second window, the first side of the second window to the position determined for the first side of the first window.

10. The method of claim 1, further comprising:

establishing a bounding window that is large enough to encompass all of the windows on the computer screen when the windows on the computer screen are positioned before the moving step; and expanding the aligned windows to fill the bounding window.

11. The method of claim 10 wherein the bounding window and each window on the computer screen has sides and the expanding step comprises aligning each side of the bounding window with the the sides of the windows that are closest to the side of the bounding window.

12. The method of claim 10, further comprising:

determining whether the expanding step would result in an overlap among the windows; and wherein the expanding step expanding to the bounding window only the windows that would not result in an overlap among the windows.

13. The method of claim 1 wherein the first and second windows overlap each other, the first window includes a plurality of sides, and the first side of the first window is the side of the first window that is parallel and closest to the first side of the second window.

14. The method of claim 1, further comprising:
   determining, for each of the windows on the computer screen, a center point for the window before the window is automatically aligned;
   determining whether the first window overlaps the center point for another of the windows on the computer screen and whether the second window overlaps the center point for another of the windows on the computer screen;
   storing a first window indicator indicating whether the first window is determined to overlap the center point of another of the windows; and
   storing a second window indicator indicating whether the second window is determined to overlap another of the windows.

15. The method of claim 14, further comprising:
   determining whether either of the first and second window indicators indicates that either of the first and second windows overlaps another of the windows; and
   wherein the moving step aligns the first window with the second window only if neither of the first and second window indicator indicates that either the first window or the second window overlaps the center point of another of the windows.

16. A method, performed by a computer, of automatically aligning windows on a computer screen, comprising the steps of:
   (a) aligning a first side of a first window with a second side of a second window based on a position of the first window relative to the second window to produce aligned windows;
   (b) displaying the aligned windows on the computer screen;
   (c) determining, prior to performing step (a), whether a first overlapping side of a first overlapping window overlaps a second overlapping side of a second overlapping window by less than a predetermined distance; and
   (d) aligning the first overlapping side with the second overlapping side only if the first overlapping side and the second overlapping side overlap by less than the predetermined distance.

17. A method, performed by a computer, of automatically aligning windows on a computer screen, comprising the steps of:
   (a) aligning a first side of a first window with a second side of a second window based on a position of the first window relative to the second window to produce aligned windows;
   (b) displaying the aligned windows on the computer screen;
   (c) determining, prior to performing step (a), whether a first overlapping side of a first overlapping window overlaps a second overlapping side of a second overlapping window by at least a predetermined distance; and
   (d) storing, prior to performing step (a), an indicator indicating whether the first overlapping window and the second overlapping window overlap by at least the predetermined distance; and wherein step (a) comprises aligning the first side of the first window with the second side of the second window only when the indicator indicates that the first window and the second window do not overlap by at least the predetermined distance.

18. A computer system for aligning display windows on a computer screen, comprising:
   an input device;
   a display device displaying the computer screen and the display windows;
   a computer connected to the input device and the display device, the computer including:
      a central processing unit;
      a memory connected to the central processing unit and storing:
         a computer program comprising instructions for determining a position of a first side of a first display window; determining a position of a first side of a second display window, the first side of the second window being parallel to and spaced from the first side of the first window, and aligning the first side of the first display window with the first side of the second display window based on the positions determined for the first sides of the first and second display windows before being aligned to produce aligned display windows when executed by the central processing unit, the aligning including moving at least one of the first sides to a new position different from the position determined for the first side being moved; and
      an operating system comprising instructions for controlling the central processing unit to execute the computer program upon receiving an instruction from a user via the input device and instructions for providing the aligned display windows to the display device upon executing the computer program.

19. The computer system of claim 18 wherein:
   the memory stores a first data structure which indicates whether the first side of the first display window has been previously moved by the computer program and a second data structure which indicates whether the first side of the second display window has been previously moved by the computer program; and
   the computer program further includes instructions for moving each of the first sides to a position between the positions determined for the first sides unless the first data structure indicates that the first side of the first display window has been previously moved or the second data structure indicates that the first side of the second display window has been previously moved.

20. The computer system of claim 19, wherein the computer program further includes instructions for moving the first side of the first display window to the position determined for the first side of the second display window when the second data structure indicates that the first side of the second display window has been previously moved by the computer program.

21. The computer system of claim 18 wherein the computer program includes instructions for determining whether any overlap would result among the display windows if the first sides of the first and second display windows were aligned and instructions which align the first side of the first display window with the first side of the second display window only if an overlap does not result among any of the display windows.

22. A method, performed by a computer, of automatically aligning a plurality of windows on a computer screen, each window of the plurality of windows having a plurality of sides and a center point, each side having an old position on the computer screen, the method comprising:

determining whether a first window of the plurality of windows would occupy the position of the center point of another of the plurality of windows before being aligned if a first side of the first window were moved to a new position at which the first side aligns with one of the sides of a second window of the plurality of windows; and moving the first of the first window to the new position only if the determining step determines that the first window would not occupy the position occupied by the center point of another of the plurality of windows before being aligned, thereby aligning the first window with the second window; and displaying the aligned first and second windows on the computer screen.

23. The method of claim 22, further comprising:

calculating a distance between the positions of the first sides of the first and second windows; and wherein the moving step comprises moving the first side of each of the first and second windows to a position that is a predetermined portion of the distance calculated between the positions determined for the first sides.

24. The method of claim 22 wherein the moving step comprises:

determining whether either of the first sides has been moved previously while automatically aligning the windows on the computer screen; and when neither of the first sides is determined to have been moved previously, moving each of the first sides to a midpoint position between the positions of first sides.

25. The method of claim 24 wherein the moving step further comprises:

when the first side of the second window is determined to have been previously moved, moving the first side of the first window to the position of the first side of the second window.

26. The method of claim 22, further comprising:

determining whether any of the windows would overlap if the first side of the second window were moved to an intermediate position between the positions of the first sides of the first and second windows; and when the movement of the first side of the second window to the intermediate position is determined not to cause any of the windows to overlap, moving each of the first sides of the first and second windows to the intermediate position.

27. The method of claim 22, further comprising:

establishing a bounding window that is large enough to encompass all of the windows on the computer screen when the windows on the computer screen are positioned before the moving step; and adjusting the sides of the windows to completely fill the bounding window with no over lap between the windows without moving any windows off of the position occupied by the window's center point before the automatic aligning began.

28. A computer-readable storage medium with executable instructions of a computer program that aligns a plurality of windows on a display screen of a computer, each window having sides, the executable instructions causing the computer to:

determine a position of a first side of a first window of the plurality of windows;

determine a position of a first side of a second window of the plurality of windows, the first side of the second window being parallel to and spaced from the first side of the first window; and align the first side of the first window with the first side of the second window based on the positions determined for the first sides of the first and second display windows before being moved, thereby producing aligned display windows on the display screen when executed by the computer, the aligning including moving at least one of the first sides to a new position different from the position determined for the first side being moved.

29. The computer storage medium of claim 28, further comprising:

computer instructions for causing the computer to calculate a distance between the positions of the first sides of the first and second windows; and wherein the instructions that cause the computer to align the first sides also cause the computer to move the first side of each of the first and second windows to a position that is a predetermined portion of the distance calculated between the positions determined for the first sides.

30. The computer storage medium of claim 28 wherein the instructions that cause the computer to align the first sides include:

computer instructions for determining whether either of the first sides has been moved previously while automatically aligning the windows on the computer screen; and computer instructions for moving each of the first sides to a midpoint position between the positions of the first sides if neither of the first sides is determined to have been moved previously.

31. The computer storage medium of claim 30 wherein the instructions that cause the computer to align the first sides include:

computer instructions for moving the first side of the first window to the position of the first side of the second window if the first side of the second window is determined to have been previously moved.

32. The computer storage medium of claim 28, further comprising:

computer instructions for determining whether any of the windows would overlap if the first side of the second window were moved to an intermediate position between the positions of the first sides of the first and second windows; and wherein the instructions include computer instructions for moving each of the first sides of the first and second windows to the intermediate position if the movement of the first side of the second window to the intermediate position is determined not to cause any of the windows to overlap.

33. A computer-implemented method of automatically aligning first and second windows on a computer screen, each of the first and second windows having sides, comprising:

determining which side of the first window is parallel to, spaced from, and nearest a side of the second window;

aligning the nearest parallel sides of the first and second windows by moving at least one of the nearest parallel sides toward the other nearest parallel side, calculating a distance between the nearest parallel sides of the first and second windows before the nearest parallel sides are aligned; and wherein the aligning step includes moving the nearest parallel side of each of the first and second windows to a position that is a predetermined portion of the distance calculated between the nearest parallel sides.

34. The method of claim 33 wherein the aligning step includes:

determining whether either of the nearest parallel sides has been moved previously while automatically aligning the windows on the computer screen; and moving each of the nearest parallel sides to a midpoint position between the positions of the nearest parallel sides if neither of the nearest parallel sides is determined to have been moved previously.

35. The method of claim 34 wherein the aligning step includes:

moving the nearest parallel side of the first window to the position of the nearest parallel side of the second window if the nearest parallel side of the second window is determined to have been previously moved.

36. The method of claim 33, further comprising:

determining whether any of the windows would overlap if the nearest parallel side of the second window were moved to an intermediate position between the positions of the nearest parallel sides of the first and second windows; and wherein the aligning step includes moving each of the nearest parallel sides of the first and second windows to the intermediate position if the movement of the nearest parallel side of the second window to the intermediate position is determined not to cause any of the windows to overlap.

37. A method in a computer system for automatically repositioning a plurality of windows that are displayed on a computer screen, each of the plurality of windows having a size and a position, the method comprising:

determining an old size and an old position of each of the plurality of windows, wherein the windows do not overlap one another and at least one of the windows has no sides that are aligned with a side of another one of the windows; and calculating a new size and a new position for each of the plurality of windows such that the windows have approximately the same relative positions with respect to each other after the windows are moved to their new positions as existed before the windows were moved to their new positions from their old positions and each of the windows includes at least one side that is aligned with a side of another one of the windows.

38. The method of claim 37, further comprising:

determining whether any of the plurality of windows overlaps another of the windows before determining the old size and old position of each window; and if any overlaps are determined to exist, removing the overlaps by placing the windows at their old positions and in their old sizes.

* * * * *